United States Patent
Farmer et al.

(10) Patent No.: US 7,222,488 B2
(45) Date of Patent: May 29, 2007

(54) FABRICATED COWL FOR DOUBLE ANNULAR COMBUSTOR OF A GAS TURBINE ENGINE

(75) Inventors: Gilbert Farmer, Cincinnati, OH (US); Steven Clayton Vise, Loveland, OH (US); Walter Byron Houchens, III, Cincinnati, OH (US); Craig Douglas Young, Maineville, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/238,542

(22) Filed: Sep. 10, 2002

(65) Prior Publication Data

US 2004/0045301 A1 Mar. 11, 2004

(51) Int. Cl.
*F02C 3/06* (2006.01)
*F02C 1/00* (2006.01)

(52) U.S. Cl. .............................. 60/747; 60/804; 60/746

(58) Field of Classification Search .................. 60/746, 60/747, 748, 804
See application file for complete search history.

(56) References Cited

U.S. PATENT DOCUMENTS

| | | | |
|---|---|---|---|
| 5,154,060 A * | 10/1992 | Walker et al. | 60/746 |
| 5,197,289 A * | 3/1993 | Glevicky et al. | 60/746 |
| 5,289,687 A | 3/1994 | Kress et al. | 60/747 |
| 5,924,288 A | 7/1999 | Fortuna et al. | 60/752 |
| 6,148,600 A | 11/2000 | Farmer et al. | 60/39.02 |
| 6,708,498 B2 * | 3/2004 | Stickles et al. | 60/776 |

* cited by examiner

Primary Examiner—Charles G. Freay
(74) Attorney, Agent, or Firm—William Scott Andes; James P. Davidson, Esq.

(57) ABSTRACT

A fabricated cowl for a double annular combustor of a gas turbine engine having a longitudinal axis extending therethrough, including an outer annular portion, an inner annular portion, and a middle annular portion. A plurality of circumferentially spaced radial slots are formed in at least one of the annular portions. The outer annular portion includes a plurality of circumferentially spaced windows of desired size formed therein, wherein a plurality of outer radial members connecting the outer annular portion and the middle annular portion are provided between adjacent windows therein. Similarly, the inner annular portion includes a plurality of circumferentially spaced windows of desired size formed therein, wherein a plurality of inner radial members connecting the inner annular portion and the middle annular portion are provided between adjacent windows therein. The cowl further includes a plurality of circumferentially spaced stiffening ribs, where each stiffening rib includes: a middle portion including a rear edge configured to substantially conform to a forward surface of the middle annular portion so that an area extending between the forward and rear edges is upstream of the middle annular portion; an outer portion including a forward edge configured to conform to a rear surface of the outer annular portion; and, an inner portion including a forward edge configured to conform to a rear surface of inner annular portion. The middle rib portion further includes a forward edge configured to extend through the radial slots when positioned in the middle annular portion, whereas the inner and outer rib portions further include a rear edge configured to extend through the radial slots when positioned in the inner and outer annular portions. Each stiffening rib is then connected to the inner, outer and middle annular portions.

11 Claims, 7 Drawing Sheets

FABRICATED COWL FOR DOUBLE ANNULAR COMBUSTOR OF A GAS TURBINE ENGINE

BACKGROUND OF THE INVENTION

The present invention relates generally to a double annular combustor for a gas turbine engine and, in particular, to a fabricated cowl for such double annular combustor having stiffening ribs which are welded into position.

In a gas turbine engine, pressurized air is provided from the compressor stage to the combustor, whereupon it is mixed with fuel and is burned in the combustion chamber. The amount of pressurized air which enters the fuel/air mixers, and correspondingly the inner an outer passages of the combustor, has typically been regulated by inner and outer cowls located upstream of the fuel/air mixers and the combustor dome.

In the case of double annular combustors, the inner and outer annular portions of the cowl are separated by a greater distance, but generally include a middle annular portion positioned therebetween. Windows are typically provided in the inner and outer annular cowl portions to enable fuel nozzles to interface with the fuel/air mixers, as well as permit cooling air to flow along the forward sides thereof. Because of the radial height required for cowls of double annular combustors, such cowls are subjected to changes in pressure loads and inner and outer compressive loads induced by thermal growth of the inner and outer liners connected thereto.

Accordingly, the prior cowl design utilized in double annular combustors has been cast and incorporates a plurality of radial members or ribs extending from the forward and aft side to assist in providing stiffness to the cowl structure. It will be appreciated that such ribs, which provide structural integrity thereto, are machined to a desired thickness. It has been found, however, that temperature gradients exist between the forward surface of the cowl and the ribs located on the aft side thereof. Such thermal mismatch then induces stresses at the interface of the rib and annulus which can impact low cycle fatigue life.

In light of the foregoing, it would be desirable for a cowl to be developed for multiple annular combustors which not only achieves the necessary structural requirements, but also minimizes any thermal gradients with the ribs therein. It would also be desirable for such a cowl to be lighter and less costly while maintaining the same air flow characteristics so as to avoid recertification of the combustor.

BRIEF SUMMARY OF THE INVENTION

In a first exemplary embodiment of the invention, a fabricated cowl for a double annular combustor of a gas turbine engine is disclosed as having a longitudinal axis extending therethrough. The fabricated cowl includes a middle annular portion, an outer annular portion and an inner annular portion. The middle annular portion further includes a plurality of circumferentially spaced radial slots formed therein. The outer annular portion includes a plurality of circumferentially spaced windows of desired size formed therein, wherein outer radial members connecting the outer annular portion and the middle annular portion are defined between adjacent windows. The inner annular portion includes a plurality of circumferentially spaced windows of desired size formed therein, wherein inner radial members connecting the inner annular portion and the middle annular portion are defined between adjacent windows. The fabricated cowl further includes a plurality of circumferentially spaced stiffening ribs, where each stiffening rib further includes: a middle portion including a forward edge configured to extend through one of the radial slots in the middle annular portion and a rear edge configured to substantially conform to a forward surface of the middle annular portion so that an area extending between the forward and rear edges is upstream of the middle annular portion; an outer portion including a forward edge configured to conform to a rear surface of the outer annular portion; and, an inner portion including a forward edge configured to conform to a rear surface of the inner annular portion. Each radial slot in the middle annular portion is sealed and each stiffening rib is connected to the outer, inner and middle annular portions.

In a second exemplary embodiment of the invention, a fabricated cowl for a double annular combustor of a gas turbine engine is disclosed as having a longitudinal axis extending therethrough. The fabricated cowl includes a middle annular portion, an outer annular portion, and a middle annular portion. The outer annular portion includes a plurality of circumferentially spaced windows of desired size formed therein, wherein outer radial members connecting the outer annular portion and the middle annular portion are defined between adjacent windows, as well as a plurality of circumferentially spaced radial slots formed therein. The inner annular portion includes a plurality of circumferentially spaced windows of desired size formed therein, wherein inner radial members connecting the inner annular portion and the middle annular portion are defined between adjacent windows, as well as a plurality of circumferentially spaced radial slots formed therein. The fabricated cowl further includes a plurality of circumferentially spaced stiffening ribs, where each stiffening rib further includes: a middle portion including a forward edge and a rear edge configured to substantially conform to a forward surface of the middle annular portion so that an area thereof is upstream of the middle annular portion; an outer portion including a rear edge configured to extend through the radial slot in the outer annular portion and a forward edge configured to conform to a rear surface of the outer annular portion so that the outer portion is downstream of the outer annular portion; and, an inner portion including a rear edge configured to extend through the radial slot in the inner annular portion and a forward edge configured to conform to a rear surface of the inner annular portion so that the inner portion is downstream of the inner annular portion. Each radial slot is sealed and each stiffening rib is connected to the outer, inner and middle annular portions.

In accordance with a third exemplary embodiment of the invention, a method of fabricating a cowl for a double annular combustor of a gas turbine engine is disclosed as including the following steps: stamping an outer annular portion, an inner annular portion and a middle annular portion so as to have desired contours; cutting a plurality of stiffening ribs; forming a plurality of circumferentially spaced radial rib slots in at least one of the inner, outer and middle annular portions; inserting the stiffening ribs through the radial rib slots; and, connecting the stiffening ribs to said inner, outer and middle annular portions. The radial slots are provided in the middle annular portion so that the stiffening ribs are inserted into the radial slots from a position rearward of the middle annular portion. Alternatively, the radial slots are provided in the inner and outer annular portions so that the stiffening ribs are inserted into the radial slots from a position forward of the inner and outer annular portions. Additional steps include cutting a plurality of circumferentially spaced windows of desired size in the outer annular portion so as to define an outer radial member between adjacent windows therein and cutting a plurality of circumferentially spaced windows of desired size in the inner annular portion so as to define an inner radial member between adjacent windows therein.

DETAILED DESCRIPTION OF THE INVENTION

Figure 1:
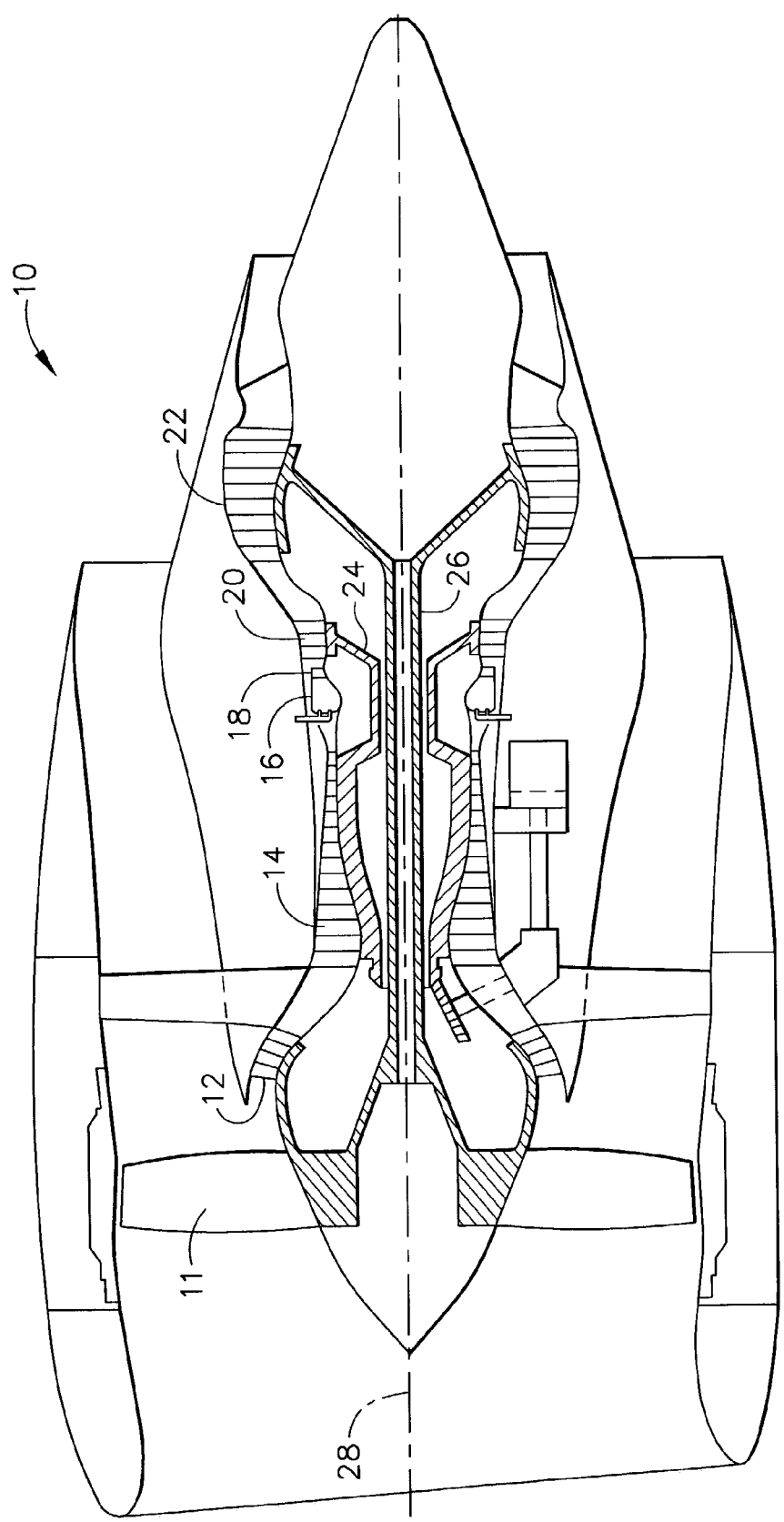
FIG. 1 is a diagrammatic cross-sectional view of a gas turbine engine including a double annular combustor like that of the present invention.

Referring now to the drawings in detail, wherein identical numerals indicate the same elements throughout the figures, FIG. 1 depicts an exemplary gas turbine engine 10 having in serial flow communication a fan 11, a low pressure compressor 12, a high pressure compressor 14, and a combustor 16. Combustor 16 conventionally generates combustion gases that are discharged therefrom through a high pressure turbine nozzle assembly 18, from which the combustion gases are channeled to a conventional high pressure turbine 20 and, in turn, to a conventional low pressure turbine 22. High pressure turbine 20 drives high pressure compressor 14 through a suitable shaft 24, while low pressure turbine 22 drives low pressure compressor 12 through another suitable shaft 26, all disposed coaxially about a longitudinal or axial centerline axis 28.

Figure 2:
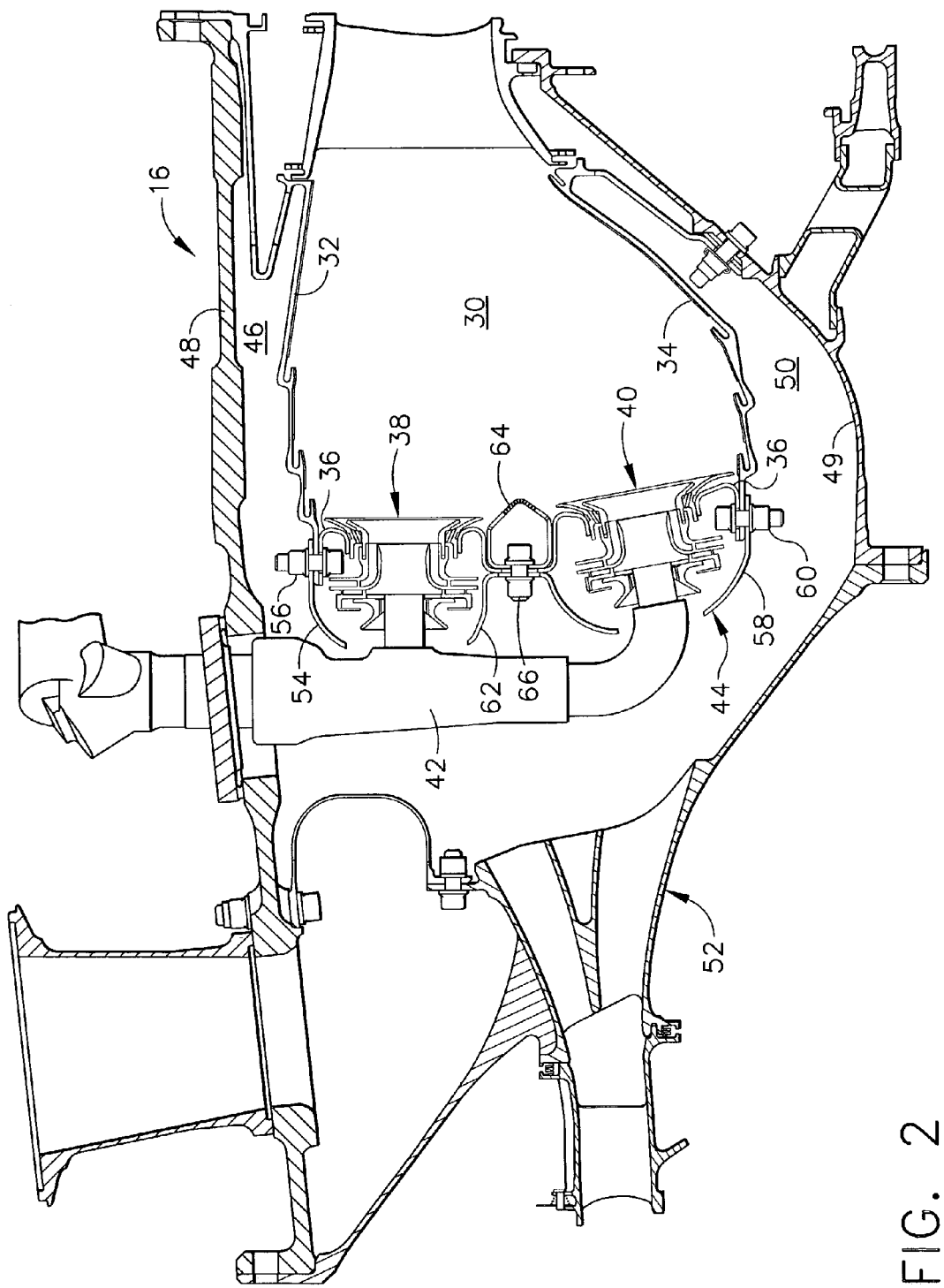
FIG. 2 is a cross-sectional view of the combustor depicted in FIG. 1 including a fabricated cowl in accordance with the present invention.

As seen in FIG. 2, combustor 16 further includes a combustion chamber 30 defined by an outer liner 32, an inner liner 34 and a dome 36. Combustor dome 36 is preferably double annular in design so that two circumferential rows of fuel/air mixers 38 and 40 are provided within openings formed in such dome 36. A fuel nozzle 42 provides fuel to fuel/air mixers 38 and 40 in accordance with desired performance of combustor 16 at various engine operating states.

It will also be noted that an annular cowl 44 is located upstream of combustion chamber 30 so as to direct air flow into fuel/air mixers 38 and 40, as well as an outer passage 46 between outer liner 32 and a casing 48 and an inner passage 50 between inner liner 34 and a support cone 49. In this way, convective cooling air is provided to the outer surfaces of outer and inner liners 32 and 34 and air for film cooling is provided to the inner surfaces of such liners. A diffuser 52 receives the air flow from high pressure compressor 14 and provides it to combustor 16. It will be seen that an outer annular portion 54 of cowl 44 is preferably attached to outer liner 32 and an outer portion of dome 36 by means of a plurality of circumferentially spaced first connectors 56 while an inner annular portion 58 of cowl 44 is preferably attached to inner liner 34 and an inner portion of dome 36 by a plurality of circumferentially spaced second connectors 60. A middle annular portion 62 of cowl 44 is preferably connected to a centerbody 64 located between outer and inner fuel/air mixers 38 and 40, respectively, by a plurality of circumferentially spaced connectors 66. It will be understood that cowl 44 is preferably fabricated, rather than casted, whereby outer annular portion 54, inner annular portion 58 and middle annular portion 62 of cowl 44 are preferably stamped from sheet metal (or other materials exhibiting similar properties) so as to have the desired contours.

Figure 3:
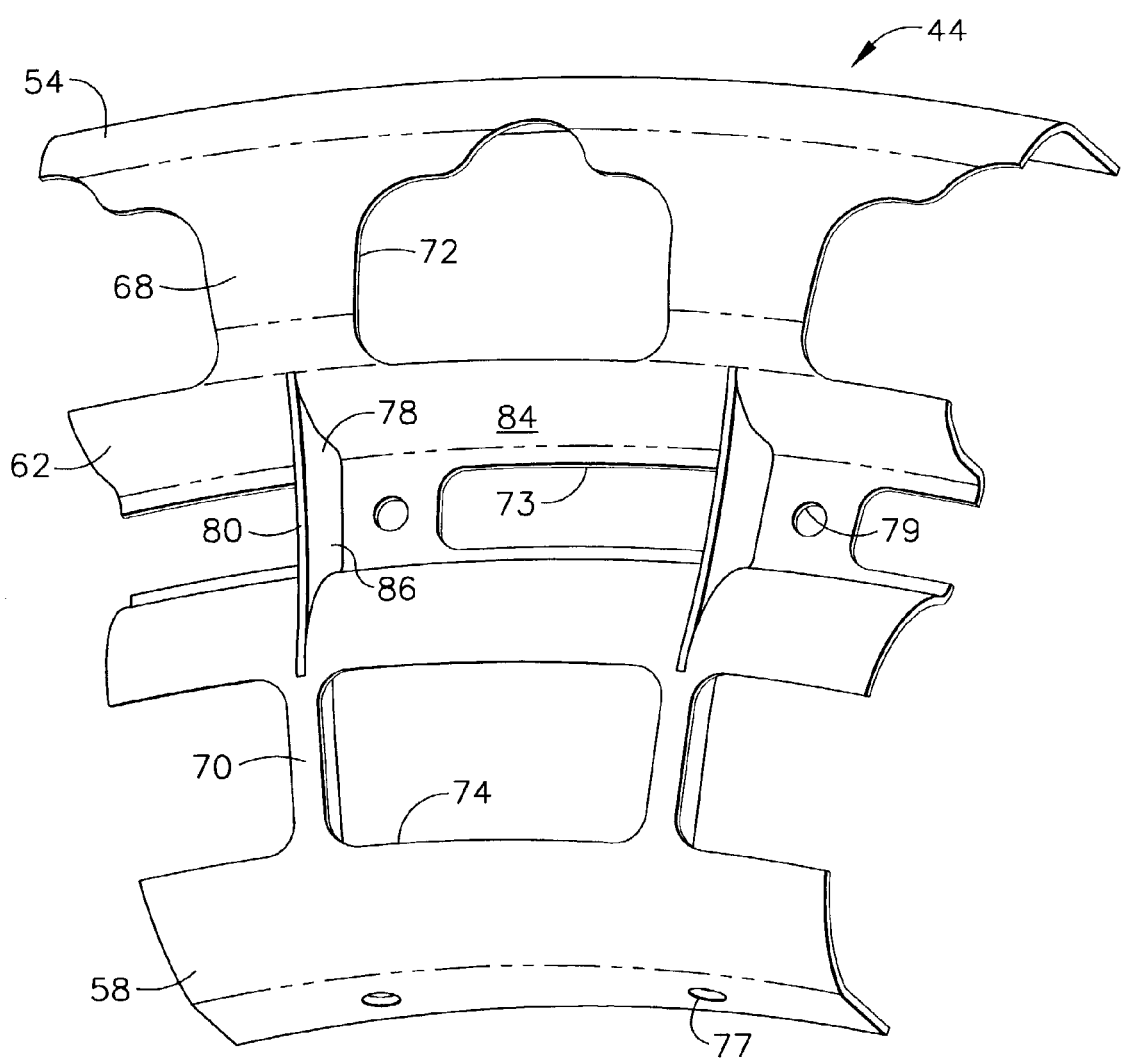
FIG. 3 is a partial forward looking aft view of the cowl depicted in FIG. 2.
Figure 4:
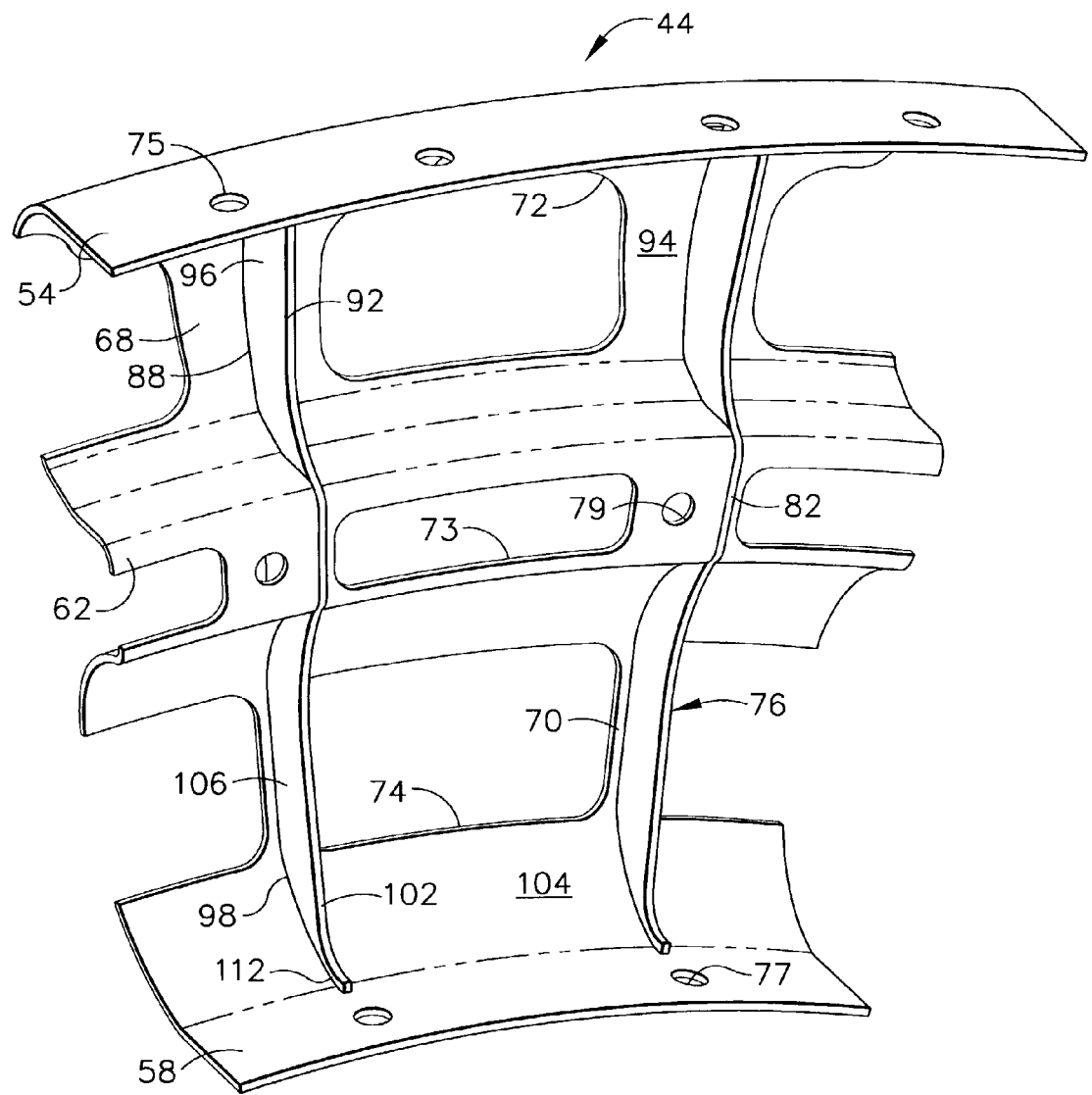
FIG. 4 is a partial aft looking forward view of the cowl depicted in FIGS. 2 and 3.
Figure 5:
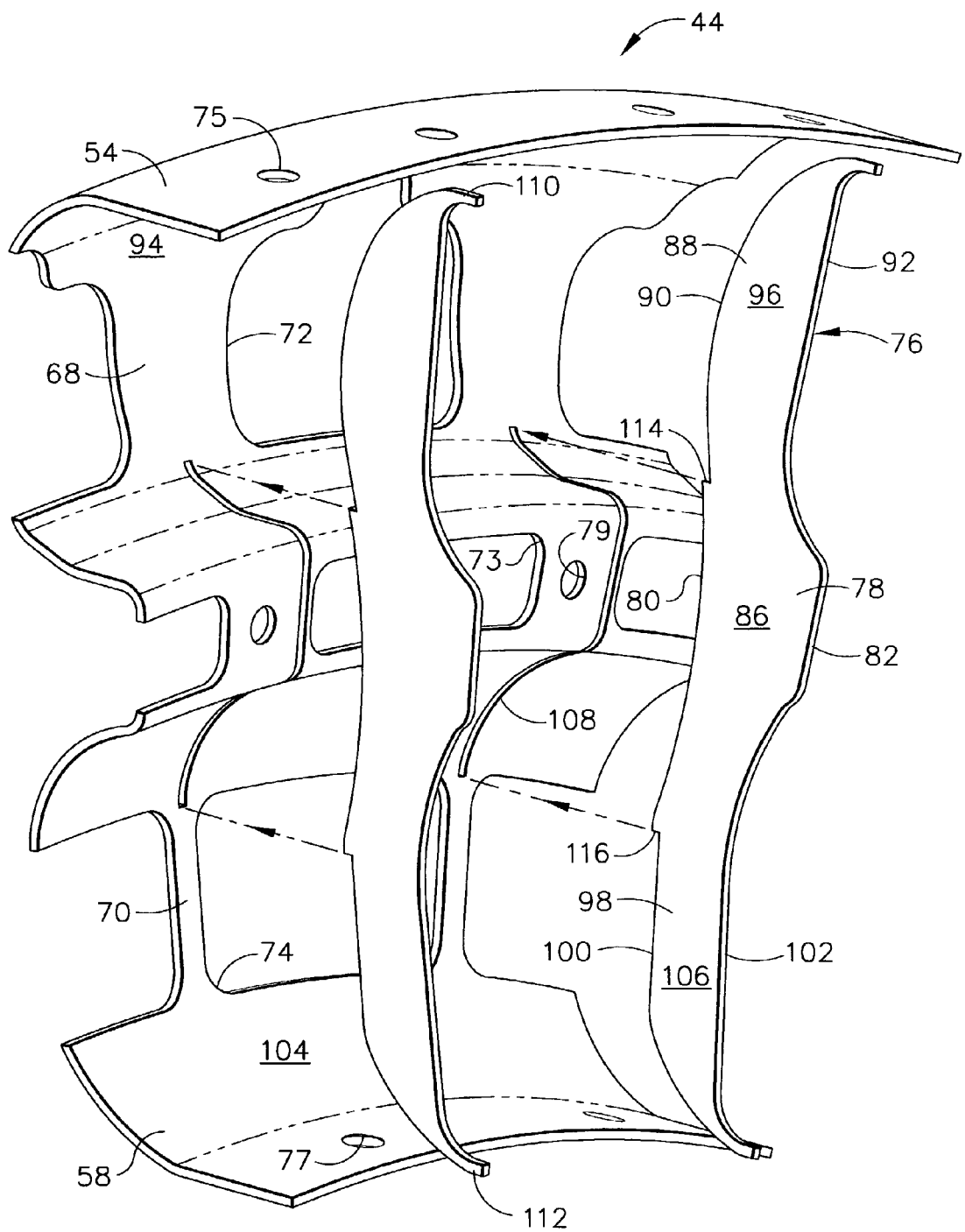
FIG. 5 is an exploded aft perspective view of the cowl depicted in FIGS. 2-4, where the stiffening ribs are shown as being inserted from a position aft of the cowl.

It will be appreciated from FIGS. 3-5 that cowl 44 preferably includes a plurality of windows 72 and 74 formed within cowl outer annular portion 54 and cowl inner annular portion 58, respectively, so as to permit the connection of fuel nozzles 42 with fuel/air mixers 38 and 40. Accordingly, a plurality of circumferentially spaced outer radial members 68 connecting outer annular portion 54 and middle annular portion 62 are defined between adjacent windows 72, as are a plurality of circumferentially spaced inner radial members 70 connecting inner annular portion 58 and middle annular portion 62 between adjacent windows 74. Windows 72 and 74 are preferably positioned so as to be in substantial radial alignment and are of a desired size to permit the appropriate amount of air flow therethrough. Windows 73 may also be formed within cowl middle annular portion 62 to provide cooling air to centerbody 64. Additional openings 75, 77 and 79 are provided in outer, inner and middle annular portions 54, 58 and 62, respectively, so that connectors 56, 60 and 66 may be utilized to attach such cowl portions as described above.

In order to provide structural integrity to cowl 44, a plurality of circumferentially spaced stiffening ribs 76 are attached thereto. This is because cowl 44 must be able to sustain changes in pressure loads thereon preferably in a range of approximately 80-120 pounds per square inch (psi), more preferably in a range of approximately 90-110 psi, and optimally pressure load changes of at least 100 psi. Moreover, cowl 44 must be able to withstand inner and outer induced compressive loads preferably in a range of approximately 500-700 pounds, more preferably in a range of approximately 540-660 pounds, and optimally loads of at least 600 pounds.

It will be seen that stiffening ribs 76 are positioned in alignment with outer and inner radial members 68 and 70. More specifically, each stiffening rib 76 preferably includes a middle portion 78 having a forward edge 80 and a rear edge 82, where rear edge 82 is configured to substantially conform to the contours of a forward surface 84 of cowl middle annular portion 62 so that an area 86 thereof extending between forward and rear edges 80 and 82 is located upstream of cowl middle annular portion 62. Each stiffening rib 76 also includes an outer portion 88 having a forward edge 90 and a rear edge 92, where forward edge 90 preferably is configured to substantially conform to the contours of a rear surface 94 of cowl outer annular portion 54 so that an area 96 thereof extending between forward and rear edges 90 and 92 is located downstream of cowl outer annular portion 54. Similarly, an inner portion 98 is provided for each stiffening rib 76 which has a forward edge 100 and a rear edge 102, where forward edge 100 preferably is configured to substantially conform to the contours of a rear surface 104 of cowl inner annular portion 58 so that an area 106 thereof extending between forward and rear edges 100 and 102 is located downstream of cowl inner annular portion 58.

It will be appreciated that rib outer portion 88 and rib inner portion 98 preferably include tip extensions 110 and 112, respectively, which extend from the outer and inner ends of rear edges 92 and 102. Tip extensions 110 and 112 not only assist in the manufacturing of ribs 76, but also provide added support for ribs 76 when positioned against rear surfaces 94 and 104 of cowl outer annular portion 54 and cowl inner annular portion 58, respectively.

In a first embodiment of the invention, it will be seen in FIGS. 3-5 that a plurality of circumferentially spaced radial slots 108 are preferably provided in cowl middle annular portion 62, where such slots 108 are in substantial alignment with outer and inner radial members 68 and 70 and sized to permit forward edge 80 of rib middle portion 78 therethrough. This permits stiffening ribs 76 to be inserted from a position aft of cowl 44 (see FIG. 5) until forward edges 90 and 100, respectively, of outer rib portion 88 and inner rib portion 98 come into contact with rear surfaces 94 and 104 of cowl outer and inner annular portions 54 and 58. Thereafter, rear edge 82 of rib middle portion 78 is preferably laser welded to forward surface 84 of cowl middle annular portion 62, as is forward edges 90 and 100 of outer and inner rib portions 88 and 98 to rear surfaces 94 and 104, respectively, of cowl outer and inner annular portions 88 and 98. In order to assist in positioning rib 76 so that only area 86 of rib middle portion 78 extends through slot 108, a first step 114 is preferably positioned between forward edges 80 and 90 of rib middle and outer portions 78 and 88 and a second step 116 is preferably positioned between forward edges 80 and 100 of rib middle and inner portions 78 and 98.

Figure 6:
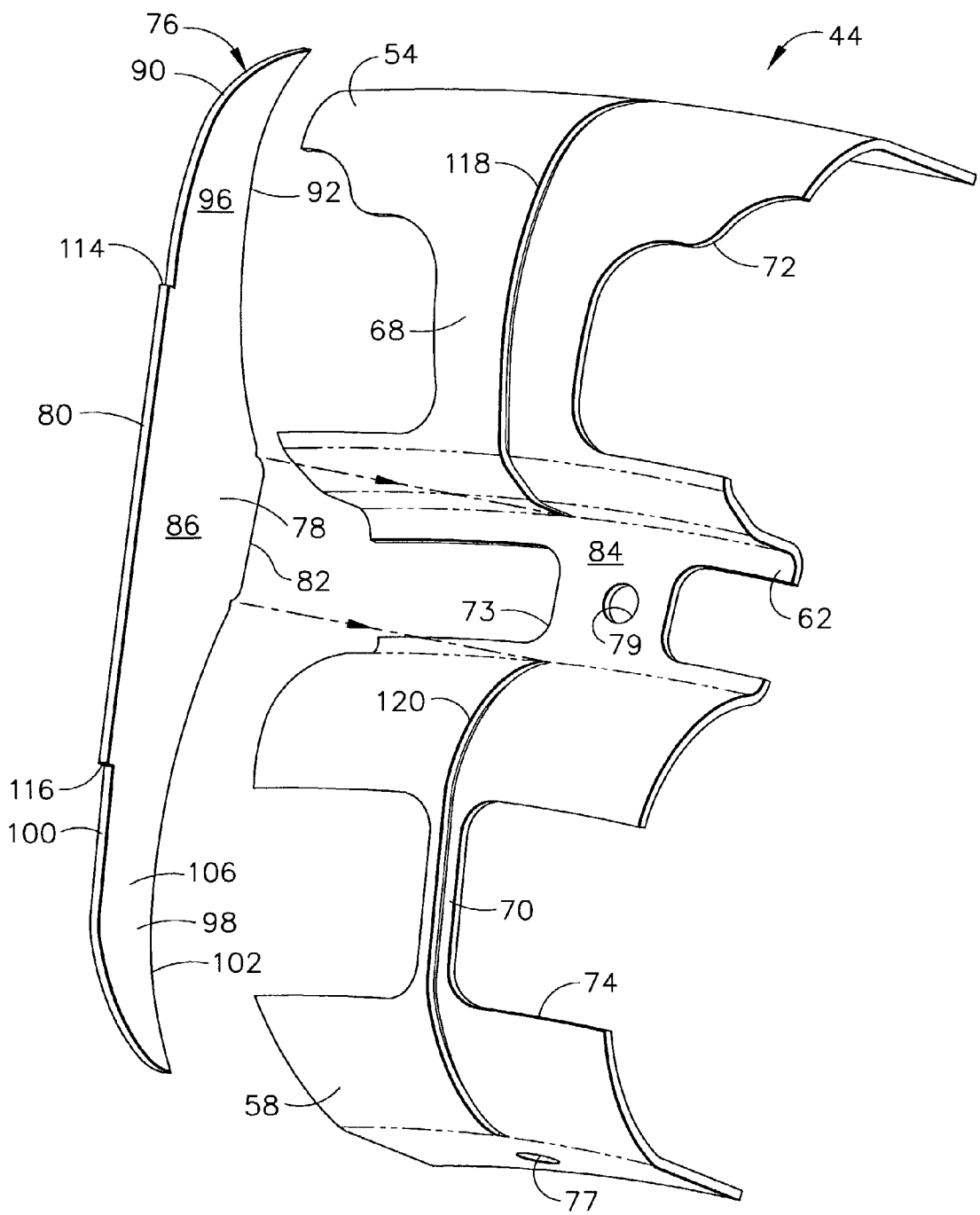
FIG. 6 is an exploded front perspective view of an alternative cowl configuration, where the stiffening ribs are shown as being inserted from a position forward of the cowl.

In an alternative embodiment, it will be seen in FIG. 6 that cowl outer annular portion 54 and cowl inner annular portion 58 each include a plurality of circumferentially spaced radial slots 118 and 120, respectively, formed therein. It is preferred that such slots be in substantial alignment with each other and located within outer and inner radial members 68 and 70. Further, radial slots 118 and 120 are preferably sized to permit rear edges 92 and 102 of rib outer portion 88 and rib inner portion 98 to slide therethrough. This configuration permits stiffening ribs 76 to be inserted from a position forward of cowl 44 (see FIG. 6) until rear edge 82 of rib middle portion 78 lies adjacent to forward surface 84 of cowl middle annular portion 62. It will also be appreciated that forward edges 90 and 100 of rib outer portion 88 and rib inner portion 98 will be positioned adjacent radial slots 118 and 120 where they are laser welded to cowl 44, as will rear edge 82 of middle rib portion 78 to forward surface 84 of cowl middle annular portion 78. Accordingly, rib outer portion area 96 and rib inner portion area 106 extend aft of rear surfaces 94 and 104 of cowl outer and inner annular portions 54 and 58.

Figure 7:
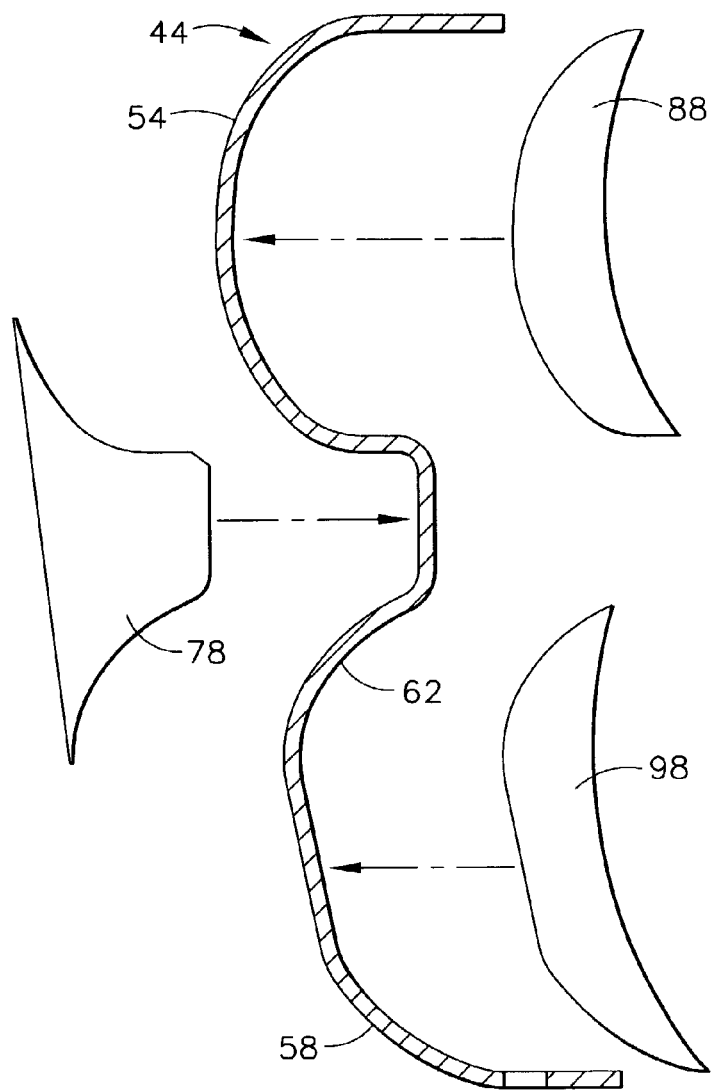
FIG. 7 is an exploded cross-sectional view of a second alternative cowl configuration, where the outer, middle and inner portions of the stiffening ribs are separated into individual portions; and, FIG. 8 is a partial sectional view of an outer radial portion connecting an outer annular portion and a middle annular portion of the cowl depicted in FIGS. 2-5.

While middle portion 78, outer portion 88, and inner portion 98 of stiffening ribs 76 are preferably formed as an integral member, such as by laser cutting, it will be understood that such rib portions may be formed as multiple pieces (see FIG. 7). It is also preferred that stiffening ribs 76 be formed of the same material as outer, inner and middle annular portions 54, 58 and 62, respectively, of cowl 44 in order to minimize the amount of thermal gradient experienced therebetween. In particular, the thermal gradient experienced between stiffening ribs 76 and the front surfaces of the cowl annular portions preferably will be in a range of approximately 640-960° F., more preferably in a range of approximately 720-880° F., and optimally no greater than approximately 800° F. Reduction in such thermal gradient between stiffening ribs 76 and cowl annular portions 54, 58 and 62 has the desirous effect of reducing stresses which impact the low cycle fatigue life of cowl 44.

With regard to the process of fabricating cowl 44, it will be appreciated that outer annular portion 54, inner annular portion 58 and middle annular portion 62 are initially formed by stamping a sheet of applicable material, such as sheet metal, so as to have the desired contours. Next, windows 72 and 74 are laser cut in cowl outer annular portion 54 and cowl inner annular portion 58 of desired size so that radial members 68 and 70, respectively, are defined therebetween. A plurality of radial slots 108 are laser cut into cowl middle annular portion 62 or, alternatively, a plurality of radial slots 118 and 120 are laser cut into cowl outer and inner annular portions 54 and 58. Stiffening ribs 76 are then inserted through the applicable radial slots 108/118 and 120. It will be understood that stiffening ribs 76 are configured so as to be inserted through the applicable radial slots and brought into a position where rear edge 82 of rib middle portion 78 conforms to and is adjacent forward surface 84 of cowl middle annular portion 62, forward edge 90 of rib outer portion 88 conforms to and is adjacent rear surface 94 of cowl outer annular portion 54, and forward edge 100 of rib inner portion 98 conforms to and is adjacent rear surface 104 of cowl inner annular portion 58. Finally, stiffening ribs 76 are preferably laser welded in position with respect to the outer, inner and middle annular portions 54, 58 and 62 of cowl 44. This entails sealing the applicable radial slots 108/118 and 120, as well as attaching the remaining edges of ribs 76 to the appropriate surfaces of cowl 44.

As indicated hereinabove, stiffening ribs 76 are generally inserted from a position aft of cowl 44 when radial slots 108 are formed in cowl middle annular portion 62. Conversely, stiffening ribs 76 are preferably inserted from a position forward of cowl 44 when radial slots 118 and 120 are formed in cowl outer and inner annular portions 54 and 58, respectively. In each case, radial slots 108, 118 and 120 are preferably formed in alignment with radial members 68 and 70. Where applicable, radial slots 118 and 120 are preferably formed in substantial alignment.

Figure 8:
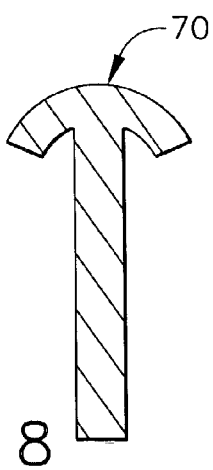

An additional step in the process may include the curling of the periphery of windows 68 and 70 in an aft direction so as to obtain better air flow characteristics therethrough. This is exhibited in FIG. 8, where a cross-section of inner radial member 70 is depicted.

Having shown and described the preferred embodiment of the present invention, further adaptations of the double annular combustor and the fabricated cowl thereof can be accomplished by appropriate modifications by one of ordinary skill in the art without departing from the scope of the invention.

What is claimed is:

1. A fabricated cowl for a double annular combustor of a gas turbine engine having a longitudinal axis extending therethrough, comprising:
   (a) a middle annular portion including a plurality of circumferentially spaced radial slots formed therein;
   (b) an outer annular portion including a plurality of circumferentially spaced windows of desired size formed therein, wherein outer radial members connecting said outer annular portion and said middle annular portion are defined between adjacent windows;

(c) an inner annular portion including a plurality of circumferentially spaced windows of desired size formed therein, wherein inner radial members connecting said inner annular portion and said middle annular portion are defined between adjacent windows; and, (d) a plurality of circumferentially spaced stiffening ribs, each said stiffening rib further comprising:

(1) a middle portion including a forward edge configured to extend through one of said radial slots in said middle annular portion and a rear edge configured to substantially conform to a forward surface of said middle annular portion so that an area extending between said forward and rear edges is upstream of said middle annular portion;

(2) an outer portion including a forward edge configured to conform to a rear surface of said outer annular portion; and, (3) an inner portion including a forward edge configured to conform to a rear surface of said inner annular portion;

wherein each said radial slot in said middle annular portion is sealed and each said stiffening rib is connected to said outer, inner and middle annular portions.

2. The fabricated cowl of claim 1, further comprising:

(a) a first step positioned between said middle portion forward edge and said outer portion forward edge; and, (b) a second step positioned between said middle portion forward edge and said inner portion forward edge;

wherein only said middle rib portion is able to extend through said radial slot.

3. The fabricated cowl of claim 1, wherein each said stiffening rib is an integral member.

4. The fabricated cowl of claim 1, wherein said cowl is able to resist a pressure load change of at least approximately 80 psi.

5. The fabricated cowl of claim 1, wherein said cowl is able to withstand inner and outer induced compressive loads of at least approximately 500 lbs.

6. The fabricated cowl of claim 1, wherein a thermal gradient between said outer, inner and middle annular portions and said stiffening ribs is no greater than approximately 960°F.

7. The fabricated cowl of claim 1, wherein said outer, inner and middle annular portions are stamped from sheet metal.

8. The fabricated cowl of claim 1, said outer portion of each stiffening rib including an outer tip extending past said rear edge thereof.

9. The fabricated cowl of claim 1, said inner portion of each stiffening rib including an inner tip extending past said rear edge thereof.

10. The fabricated cowl of claim 1, wherein said radial slots in said middle annular portion are substantially aligned with said outer and inner radial members.

11. A fabricated cowl for a double annular combustor of a gas turbine engine having a longitudinal axis extending therethrough, comprising;

(a) a middle annular portion;

(b) an outer annular portion, including:

(1) a plurality of circumferentially spaced windows of desired size formed therein, wherein outer radial members connecting said outer annular portion and said middle annular portion are defined between adjacent windows; and (2) a plurality of circumferentially spaced radial slots formed therein;

(c) an inner annular portion including:

(1) a plurality of circumferentially spaced windows of desired size formed therein, wherein inner radial members connecting said inner annular portion and said middle annular portion are defined between adjacent windows; and (2) a plurality of circumferentially spaced radial slots formed therein; and, (d) a plurality of circumferentially spaced stiffening rib, each said stiffening rib further comprising:

(1) a middle portion including a forward edge and a rear edge configured to substantially conform to a forward surface of said middle annular portion so that an area thereof is upstream of said middle annular portion;

(2) an outer portion including a rear edge configured to extend through said radial slot in said outer annular portion and a forward edge configured to conform to a rear surface of said outer annular portion so that said outer portion is downstream of said outer annular portion; and, (3) an inner portion including a rear edge configured to extend through said radial slot in said inner annular portion and a forward edge configured to conform to a rear surface of said inner annular portion so that said inner portion is downstream of said inner annular position;

wherein each said radial slot is sealed and each said stiffening rib is connected to said outer, inner and middle annular portions.

* * * * *